J. F. HASKINS.

Connecting-Rod.

No. 6,255. Reissued Jan. 26, 1875.

WITNESSES.

Wm. Garner

Chas. Lemon

INVENTOR.

J. F. Haskins per

F. A. Lehmann, atty.

THE GRAPHIC CO. PHOTO-LITH. 39 & 41 PARK PLACE, N.Y.

UNITED STATES PATENT OFFICE.

JOHN F. HASKINS, OF FITCHBURG, MASSACHUSETTS.

IMPROVEMENT IN CONNECTING-RODS.

Specification forming part of Letters Patent No. 134,276, dated December 24, 1872; reissue No. 6,255, dated January 26, 1875; application filed January 15, 1875.

*To all whom it may concern:*

Be it known that I, JNO. F. HASKINS, of Fitchburg, in the county of Worcester and State of Massachusetts, have invented certain new and useful Improvements in Connecting-Rods; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The nature of my invention relates to an improvement in connecting-rods; and it consists in a solid rod having a suitably-shaped opening or slot cut through its stub end, in which are placed the two half-boxes having a flange formed upon their ends, so as to grasp or embrace both sides of the rod, and a wedge actuated by a screw or screws, for tightening the boxes upon the crank as they wear away, as will be more fully described hereafter.

Figure 1:
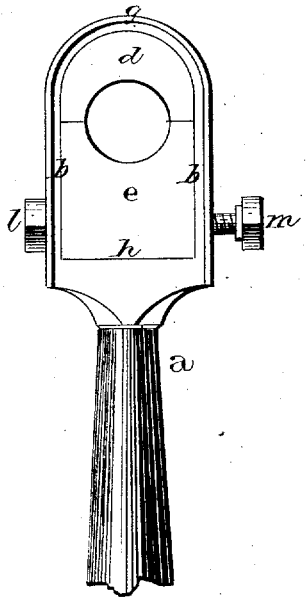
Figure 2:
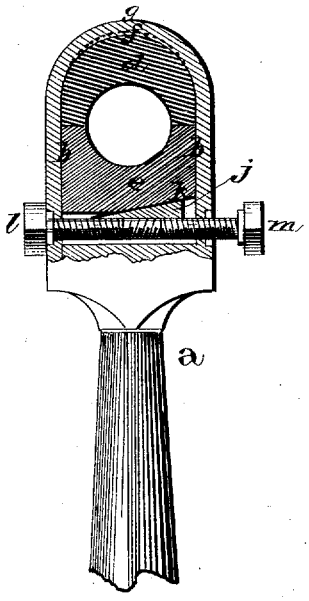
Figure 3:
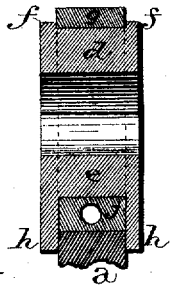
Figure 4:
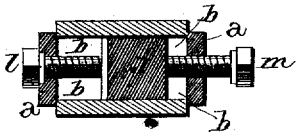

Figure 1 shows a side elevation of my invention complete. Fig. 2 is a cross-section of the same. Fig. 3 is a longitudinal central section of the box; and Fig. 4, a transverse central section.

*a* represents a connecting-rod made of one solid piece of metal, and which has the slot or opening *b* cut through its stub end to receive the two boxes *d e*. The upper box, *d*, made preferably semicircular upon its outer end, so as to correspond to the rounding end *g* of the slot, has a flange, *f*, formed around its outer edge, as shown in Fig. 2, so as to clasp each side of the rod, and retain the box in position in the slot. The lower box, *e*, has also a flange formed upon each of its inner edges, as shown at *h*, which lap the two sides of the rod, and project some distance down below the square end *c* of the slot. The rear end of this box, in between the two flanges, is beveled away, so as to form an inclined plane, *k*, upon which the wedge *j* acts to tighten the boxes upon the crank. The wedge has an opening, preferably entirely through it, and is made to slide in either direction by means of one or two screws passing through the side of the rod into it.

By loosening either screw *l* or *m*, and turning up the other, the boxes can be tightened or loosened at pleasure. Though two screws are here shown, it is obvious that a single one, swiveled or otherwise connected to the wedge, would answer every purpose.

By forming a flange, *f*, upon each of the edges of the outer end of the box *d*, and making the box and end of the slot semicircular, and the flanges *h* upon the inner end of the box *e*, the rod *a* can be made in one solid piece, as here shown, so as to dispense with the usual bolts, keys, and other parts, which are now generally used, and which are only a source of trouble and weakness.

By sliding the wedge back against the side of the rod the upper box will slip down, so that the flanges *f* will drop below the inner edge of the slot at *g*, when the box can at once be withdrawn sidewise. The upper half having been taken out, the lower part, *e*, is raised upward until the flanges *h* rise above the edge *c*, when it also slips out sidewise.

Having thus described my invention, I claim—

1. The combination of a solid connecting-rod, *a*, with the two boxes *d e*, having the flanges *f h* formed upon their ends, and a wedge operated by a screw or screws to tighten or loosen them upon the crank, substantially as set forth.

2. The rod *a* and boxes *d e*, having the flanges *f h* upon their ends, in combination with the wedge *j* and screws *l m*, substantially as shown and described.

JOHN F. HASKINS.

Witnesses:
E. C. HAYWARD,
FRED. FOSDICK.